US009059847B2

(12) United States Patent
Lee et al.

(10) Patent No.: US 9,059,847 B2
(45) Date of Patent: Jun. 16, 2015

(54) RELIABLE MULTICAST BROADCAST IN WIRELESS NETWORKS

(71) Applicant: International Business Machines Corporation, Armonk, NY (US)

(72) Inventors: Kang-Won Lee, Nanuet, NY (US); Ramya Raghavendra, White Plains, NY (US); Yang Song, San Jose, CA (US); Ho Yin Starsky Wong, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 13/871,562

(22) Filed: Apr. 26, 2013

(65) Prior Publication Data

US 2014/0325302 A1    Oct. 30, 2014

(51) Int. Cl.
 *H04L 1/18* (2006.01)
 *H04L 1/00* (2006.01)
 *H04L 1/16* (2006.01)

(52) U.S. Cl.
 CPC ............. *H04L 1/1819* (2013.01); *H04L 1/0002* (2013.01); *H04L 1/0035* (2013.01); *H04L 1/1607* (2013.01); *H04L 1/1838* (2013.01); *H04L 2001/0093* (2013.01)

(58) Field of Classification Search
 None
 See application file for complete search history.

(56) References Cited

U.S. PATENT DOCUMENTS

| | | | |
|---|---|---|---|
| 6,480,497 B1 | 11/2002 | Flammer, III et al. | |
| 6,940,856 B2 * | 9/2005 | Vu | 370/390 |
| 7,808,908 B1 | 10/2010 | Bharghavan et al. | |
| 8,826,102 B2 | 9/2014 | Liu et al. | |
| 2004/0228282 A1 | 11/2004 | Bao et al. | |
| 2006/0146822 A1 | 7/2006 | Kolakowski et al. | |
| 2008/0002621 A1* | 1/2008 | Ginzburg et al. | 370/331 |
| 2008/0064425 A1* | 3/2008 | Kim et al. | 455/466 |
| 2008/0168332 A1 | 7/2008 | Palanki et al. | |
| 2009/0067336 A1 | 3/2009 | Cho et al. | |
| 2009/0135950 A1 | 5/2009 | Hoffmann et al. | |
| 2010/0002692 A1 | 1/2010 | Bims | |

(Continued)

OTHER PUBLICATIONS

"SRM (Scalable Reliable Multicast)", http://www.icir.org/floyd/srm.html, retrieved Mar. 4, 2013, 2 pages.

(Continued)

*Primary Examiner* — Daniel McMahon
(74) *Attorney, Agent, or Firm* — Francis Lammes; Stephen J. Walder, Jr.; Preston J. Young

(57) ABSTRACT

A mechanism is provided for transmitting a multicast session to a plurality of receivers over a wireless network. A forward error correction (FEC) overhead and a transmission rate are determined for transmission of a next data block of the multicast session based on received channel conditions. The next data block is multicast using the determined FEC overhead and transmission rate. Responsive to an indication of common missing packets from the next data block from more than one receiver in the plurality of receivers, the common missing packets are multicast to the plurality of receivers using the determined FEC overhead and transmission rate. Responsive to an indication of uncommon missing packets from the data block from one or more receivers, for each receiver in the one or more receivers, the uncommon missing packets identified by the receiver are unicast using the determined FEC overhead and transmission rate.

17 Claims, 5 Drawing Sheets

(56) References Cited

U.S. PATENT DOCUMENTS

| | | | |
|---|---|---|---|
| 2010/0050055 | A1 | 2/2010 | Tanaka et al. |
| 2010/0074135 | A1 | 3/2010 | Pepper |
| 2010/0223533 | A1* | 9/2010 | Stockhammer et al. ...... 714/776 |
| 2010/0226262 | A1 | 9/2010 | Liu et al. |
| 2010/0235710 | A1 | 9/2010 | Kawamoto et al. |
| 2010/0260180 | A1 | 10/2010 | Wu et al. |
| 2011/0059691 | A1 | 3/2011 | Hegge |
| 2011/0243052 | A1 | 10/2011 | Alay et al. |
| 2011/0264977 | A1 | 10/2011 | Chen et al. |
| 2012/0011413 | A1 | 1/2012 | Liu et al. |
| 2013/0263201 | A1* | 10/2013 | Chung-How et al. ......... 725/116 |
| 2013/0294321 | A1* | 11/2013 | Wang et al. ................... 370/312 |
| 2014/0040495 | A1 | 2/2014 | Kamath et al. |
| 2014/0307734 | A1* | 10/2014 | Luby et al. .................... 370/390 |

OTHER PUBLICATIONS

Adamson, B. et al., "NACK-Oriented Reliable Multicast (NORM) Transport Protocol", IETF Trust, Network Working Group Request for Comments: 5740, Nov. 2009, pp. 1-95.

Bhandari, Vartika et al., "Reliable Local Broadcast in a Wireless Network Prone to Byzantine Failures", Proceedings of the DIALM-POMC International Workshop on Foundations of Mobile Computing, Portland, Oregon, Aug. 16, 2007, 8 pages.

Gossain, Hrishikesh et al., "Multicast: Wired to Wireless", Multicasting in a Wireless Environment, IEEE Communications Magazine, Jun. 2002, pp. 116-123.

Kondo, Yoshihisa et al., "Reliable Wireless Broadcast with Random Network Coding for Real-time Applications", WCNC 2009 proceedings, http://www-mobile.ecs.soton.ac.uk/home/conference/wcnc2009/DATA/T03S32P02.PDF, IEEE 2009, retrieved Apr. 26, 2013, 6 pages.

Kumar, Rajnish et al., "On Improving Wireless Broadcast Reliability of Sensor Networks Using Erasure Codes", http://www.cc.gatech.edu/projects/up/publications/kumar-fbcast_msn06.pdf, retrieved Apr. 26, 2013, 15 pages.

McKinley, Philip K. et al., "A Study of Adaptive Forward Error Correction for Wireless Collaborative Computing", IEEE Transactions on Parallel and Distributed Systems, vol. 13, No. 9, Sep. 2002, pp. 936-947.

Mohsin, Mansoor et al., "Reliable Broadcast in Wireless Mobile Ad Hoc Networks", Proceedings of the 39th Hawaii International Conference on System Sciences, 2006, 10 pages.

Nafaa, Abdelhamid et al., "Forward Error Correction Strategies for Media Streaming over Wireless Networks", Mobile Internet Technologies and Applications, IEEE Communications Magazine, Dec. 2007/Jan. 2008, pp. 72-79.

Nguyen, Dong et al., "Wireless Broadcasting Using Network Coding", http://code.ucsd.edu/netcod07/abstracts/NetCod07-NgNgBo.pdf, retrieved Apr. 26, 2013, 6 pages.

Paul, Sanjoy et al., "Reliable Multicast Transport Protocol (RMTP)", IEEE Journal on Selected Areas in Communications, vol. 15, No. 3, Apr. 1997, pp. 407-421.

Rizzo, Luigi et al., "RMDP: an FEC-based Reliable Multicast protocol for wireless environments", ACM SIGMOBILE Mobile Computing and Communications Review, vol. 2, No. 2, Apr. 1998, pp. 23-31.

Rubenstein, Dan, "Real-Time Reliable Multicast Using Proactive Forward Error Correction", University of Massachusetts—Amherst, Computer Science Department Faculty Publication Series, Paper 70, 1998, 16 pages.

Stann, Fred et al., "RBP: Reliable Broadcast Propagation in Wireless Networks", USC/Information Sciences Institute, Technical Report ISI-TR-2005-608, http://www.isi.edu/~johnh/PAPERS/Stann05b.pdf, Nov. 2005, 15 pages.

Stann, Fred et al., "RBP: Reliable Broadcast Propagation in Wireless Networks", USC/ISI Technical Report ISI-TR-2005-608, Submitted to Mobisys 2006, Uppsala, Sweden, Jun. 19-22, 2006, 14 pages.

Stann, Fred et al., "RBP: Robust Broadcast Propagation in Wireless Networks", SenSys'06, Boulder, Colorado, Nov. 103, 2006, pp. 85-98.

Varshney, Upkar, "Multicast Over Wireless Networks", Communications of the ACM, vol. 45, No. 12, Dec. 2002, pp. 31-37.

Vinh, Phan V. et al., "RSBP: A Reliable Slotted Broadcast Protocol in Wireless Sensor Networks", Open Access, Sensors 2012, Received: Sep. 15, 2012; in revised form: Oct. 27, 2012; Accepted: Oct. 29, 2012; published Oct. 31, 2012, 17 pages.

Xiao, Weiyao et al., "Reliable Wireless Broadcasting with Near-Zero Feedback", http://people.bu.edu/staro/Infocom_QE_Final.pdf, retrieved Apr. 26, 2013, 9 pages.

U.S. Appl. No. 13/562,506, 1 page.

U.S. Appl. No. 13/593,590, 1 page.

Alay, Ozgu et al., "Cooperative Layered Video Multicast Using Randomized Distributed Space Time Codes", IEEE Transactions on Multimedia, vol. 13, No. 5, Oct. 2011, pp. 1127-1140.

Lee, T.W. A. et al., "Joint Allocation of Bandwidth and FEC Across Layers for Video Multicast over Wired and Wireless Networks", IEEE Globecom 2001, 23 pages.

Lee, Kyungsoo et al., "On the Utility of Rate Adaptation for Broadcast/Multicast Media Traffic in 802.11 Networks", ACM CoNEXT'09 Student Workshop, Rome, Italy, Dec. 1, 2009, 2 pages.

Liu, Leo X. et al., "Rate-distortion Optimized Joint Source/Channel Coding of WWAN Multicast Video for A Cooperative Peer-to-Peer Collective", IEEE Transactions on Circuits and Systems for Video Technology, Mar. 2010, 16 pages.

Pefkianakis, Ioannis et al., "MIMO Rate Adaptation in 802.11n Wireless Networks", ACM MobiCom '10, Chicago, IL Sep. 20-24, 2010, 12 pages.

Piamrat, Kandaraj et al., "Q-DRAM: QoE-based Dynamic Rate Adaptation Mechanism for Multicast in Wireless Networks", IEEE Globecom, 2009, 6 pages.

Samokhina, Maria et al., "Raptor Code-Based Video Multicast over IEEE 802.11 WLAN", Proceedings of IEEE TVS Asia Pacific Communications Symposium APWCS08, 2008, 5 pages.

Vutukuru, Mythili et al., "Cross-Layer Wireless Bit Rate Adaptation", ACM SIGCOMM'09, Aug. 17-21, 2009, Barcelona, Spain, 12 pages.

Wong, Starsky H. et al., "Robust Rate Adaptation for 802.11 Wireless Networks", ACM MobiCom '06, Sep. 23-26, 2006, Los Angeles, CA, 12 pages.

Xu, Xiaofeng et al., "Fine-Granular-Scalability Video Streaming Over Wireless Lans Using Cross Layer Error Control", IEEE, ICASSP, 2004, 4 pages.

Stann, Fred et al., "RBP: Robust Broadcast Propagation in Wireless Networks", SenSys'06, Boulder, Colorado, Nov. 1-3, 2006, pp. 85-98.

Wong, Starsky H. et al., "A Joint Rate and FEC Adaptation to Enable Approach to Enable High Speed Broadcast in IEEE 802.11 Networks", The Sixth Annual Conference of the International Technology Affiance (ACITA 2012), Southampton, UK, Sep. 2012, 8 pages.

\* cited by examiner

RELIABLE MULTICAST BROADCAST IN WIRELESS NETWORKS

GOVERNMENT RIGHTS

This invention was made with Government support under Contract No.: W911NF-06-3-0001 awarded by the U.S. Army. The Government has certain rights in this invention.

BACKGROUND

The present application relates generally to an improved data processing apparatus and method and more specifically to mechanisms for a reliable multicast broadcast in a wireless network.

Multicast is the delivery of a message or information to a group of destination computing devices simultaneously in a single transmission from the source. Multicast is most commonly implemented in IP multicast, which is often employed in Internet Protocol (IP) applications of streaming media and Internet television. IP multicast is a technique for one-to-many and many-to-many real-time communication over an IP infrastructure in a network. IP multicast scales to a larger receiver population by requiring neither prior knowledge of a receiver's identity nor prior knowledge of the number of receivers. Multicast uses network infrastructure efficiently by requiring the source to send a packet only once, even if it needs to be delivered to a large number of receivers. The nodes in the network (typically network switches and routers) take care of replicating the packet to reach multiple receivers such that messages are sent over each link of the network only once.

SUMMARY

In one illustrative embodiment, a method, in a data processing system, is provided for transmitting a multicast session to a plurality of receivers over a wireless network. The illustrative embodiment determines a forward error correction overhead and a transmission rate for transmission of a next data block of the multicast session based on channel conditions received from the plurality of receivers for a previous data block. The illustrative embodiment multicasts the next data block using the determined forward error correction overhead and transmission rate. The illustrative embodiment multicasts common missing packets to the plurality of receivers using the determined forward error correction overhead and transmission rate in response to an indication of the common missing packets from the next data block from more than one receiver in the plurality of receivers. For each receiver in the one or more receivers, the illustrative embodiment unicasts uncommon missing packets identified by the receiver using the determined forward error correction overhead and transmission rate in response to an indication of uncommon missing packets from the data block from the one or more receivers in the plurality of receivers.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

While reliable multicast in the wired Internet has been studied extensively, many of the studied solutions have not been implemented. Further, the studies for the wired internet cannot be applied directly for reliable broadcast in wireless networks. That is, multicast and broadcast transmission mode employed by wireless local area network (WLAN) access points and cellular base stations are not reliable and data may be lost during transmission. Common reliability mechanisms such as automatic repeat-request (ARQ) may not be utilized due to the unavailability of acknowledgement in multicast and broadcast transmissions. While there are studies for reliable multicast over wireless, the studied solutions are either wholly not adaptive or only partially adaptive. Hence, the performance of these solutions is bound to be suboptimal and/or not practically useful.

The illustrative embodiments provide reliable multicast in the wireless network. More specifically, the illustrative embodiments enable efficient reliable multicast by WLAN access points or cellular base stations when the same data is sent to multiple receivers. The described reliable multicast mechanism combines forward error correction and wireless rate adaption jointly with retransmission of coded packets to be transmitted to receivers based on the amount of data packets that cannot be recovered by the receivers.

Figure 1:
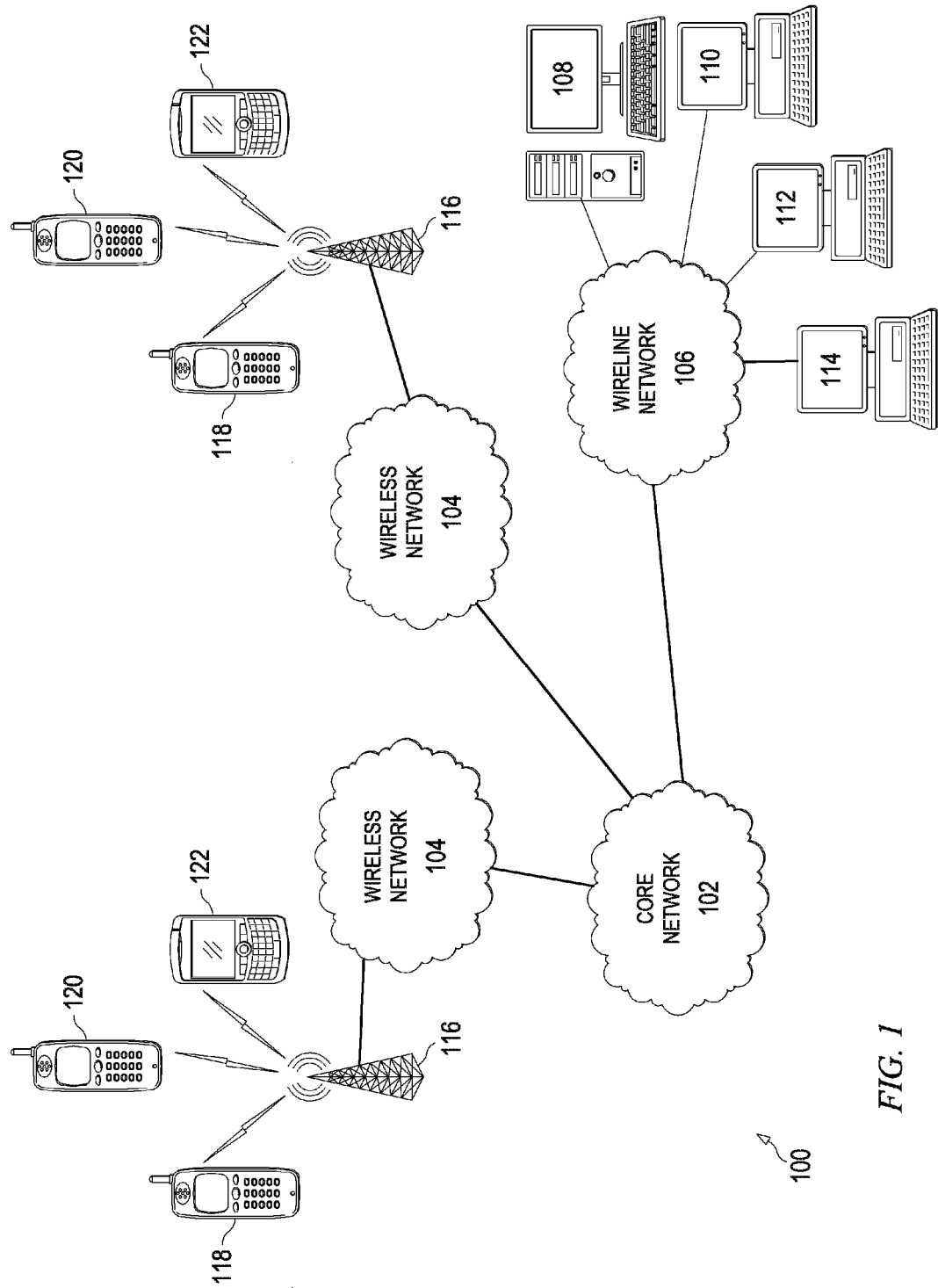
FIG. 1 is an exemplary diagram of a system of communication networks and communication devices in which exemplary aspects of the illustrative embodiments may be implemented.
Figure 2:
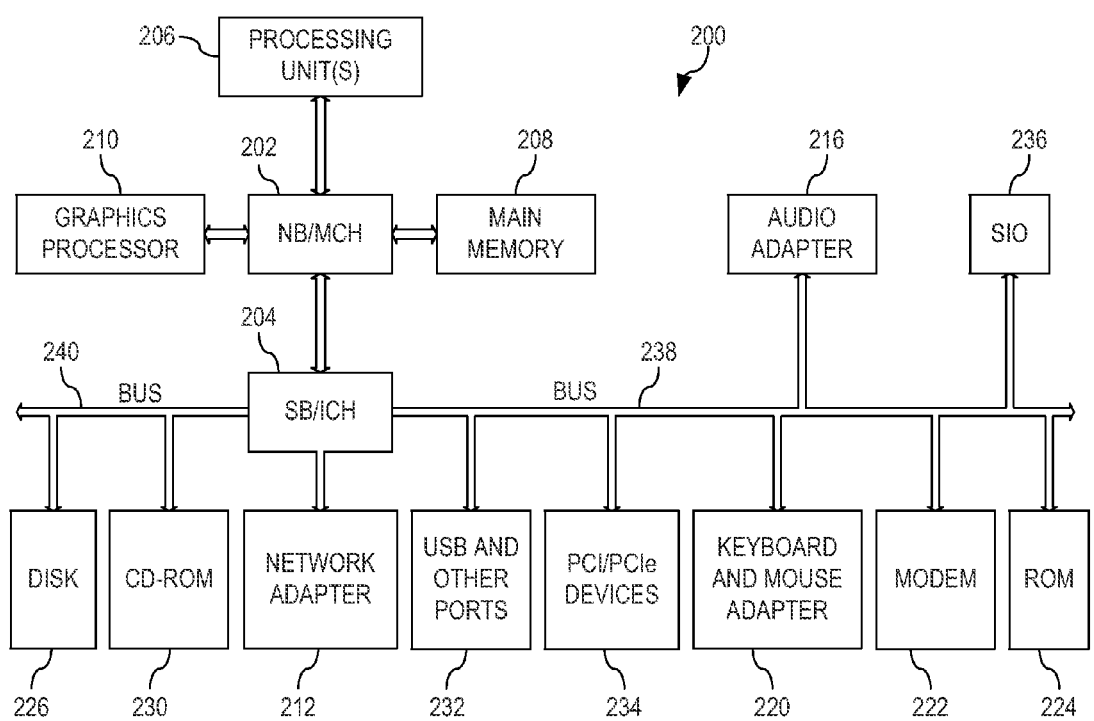
FIG. 2 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is an exemplary diagram of a system of communication networks and communication devices in which exemplary aspects of the illustrative embodiments may be implemented. As shown in FIG. 1, system 100 includes a plurality of networks 102, 104, and 106. In particular, core network 102, wireless network 104, and wireline network 106 are depicted. It should be noted that while only these three types of networks are depicted in FIG. 1, the present invention is not limited to only these types of networks or does not require the inclusion of all of these types of networks. Other types of communication networks may be used in addition to or in replacement of one or more of depicted networks 102, 104, and 106 without departing from the spirit and scope of the present invention.

Wireline network 106 may comprise one or more networks of the same or different types. For example, wireline network 106 may comprise one or more local area networks (LANs), wide area networks (WANs), wireless local area networks (WLANs), the Internet, and the like. Similarly, wireless network 104 may comprise one or more networks of the same or different types. Essentially, any number and type or combination of types of communication networks may be used with the illustrative embodiments without departing from the spirit and scope of the present invention.

Each network 102, 104, and 106 has one or more communication devices coupled to it through either wired or wireless communication links. For example, wireline network 106 has server 108 and client devices 110-114 coupled to it via communication links generally known in the art. Client devices 110-114 preferably have the capability to perform one or more of voice telephone communications, electronic mail message communications, instant text message communications, or the like.

Wireless network 104 has a plurality of wireless communication devices 118, 120, and 122, which may be a cell phone, PDA, or the like, which communicate via wireless network 104 through wireless communication point 116, e.g., a wireless base station, wireless access point, or the like. Wireless communication devices 118, 120, and 122 may be, for example, wireless telephones, personal digital assistants, pagers, or the like. Wireless communication devices 118, 120, and 122 preferably have the capability to perform one or more of voice telephone communications, electronic mail message communications, instant text message communications, or the like. Wireless network 104 is a network in which messages, communications, information, or the like may be communicated between devices and such messages, communications, information, or the like may be essentially any type of data.

Core network 102 is the central part of a telecommunication network that provides various services to customers who are connected by the access networks, such as wireless network 104 and wireline network 106. One of the main functions is to route telephone calls across the public switched telephone network (PSTN). Typically, core network 102 provides paths for the exchange of information between different sub-networks. For enterprise networks serving one organization, the term backbone is more used, while for service providers, the term core network is more often used.

FIG. 2 is a block diagram of an example data processing system in which aspects of the illustrative embodiments may be implemented. Data processing system 200 is an example of a computer, such as client 110 or wireless communication devices 118 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
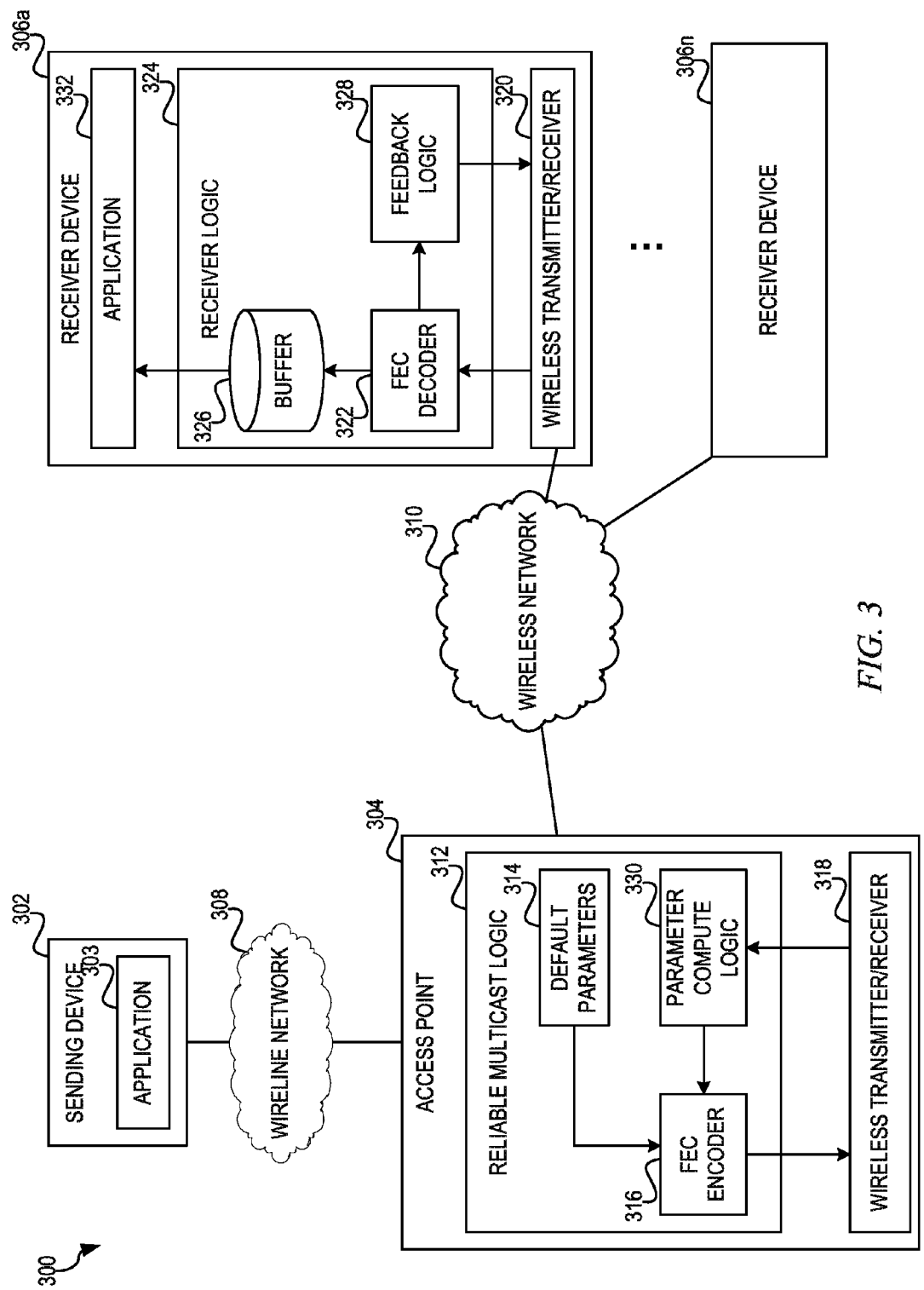
FIG. 3 depicts a block diagram schematically showing the components for enabling an efficient reliable multicast by wireless local area network (WLAN) access points or cellular base stations in wireless networks in accordance with an illustrative embodiment.

FIG. 3 depicts a block diagram schematically showing the components for enabling an efficient reliable multicast by wireless local area network (WLAN) access points or cellular base stations in wireless networks in accordance with an illustrative embodiment. Data processing system 300 comprises sending device 302, access point 304, and receiving devices 306a-306n, which are receivers. While FIG. 3 depicts access point 304, the illustrative embodiments recognizes that access point 304 may be any type of intermediary device, such as a base station, NodeB, eNodeB, router, or the like, without departing from the spirit and scope of the invention. Further, while only one access point 304 is depicted servicing receiving devices 306a-306n, the illustrative embodiment recognizes that there may be many access points coupled to sending device 302 and servicing receiving devices 306a-306n and that the access points each operate in the following manner.

Sending device 302 may be a remote server that is coupled to access point 304 via network 308. Alternatively, the sender may be collocated with access point 304 and thus directly wired to access point 304. In either case, sending device 302 sends data from application 303 using a reliable data transport protocol such as Transmission Control Protocol (TCP), User Datagram Protocol (UDP), or the like, to access point 304. Access point 304 converts the data into a reliable multicast session which is then sent to receiving devices 306a-306n via wireless network 310. In other words, the reliable multicast session is controlled by access point 304.

During an initial multicast session, sending device 302 sends an initial data block to access point 304. Reliable multicast logic 312 within access point 304 utilizes default parameters 314 that specify a default forward error correction (FEC) overhead and a default transmission rate to use for the transmission of the initial data block to receiving devices 306a-306n. FEC encoder 316 encodes the initial data block using default parameters 314, which is then forwarded to wireless transmitter/receiver 318. Wireless transmitter/receiver 318 then multicasts the encoded initial data block via a reliable data transport protocol to receiving devices 306a-306n.

Within each of receiving devices 306a-306n, wireless transmitter/receiver 320 receives the encoded initial data block and forwards the encoded initial data block to FEC decoder 322 within receiver logic 324. FEC decoder 322 decodes the encoded initial data block and stores the initial data block in buffer 326. Based on the status of the data within the received data block, feedback logic 328 within receiver logic 324 responds with missing packets from the initial data block. Wireless transmitter/receiver 318 receives an indication of missing data packets from each of receiving devices 306a-306n. Reliable multicast logic 312 determines common missing packets between receiving devices 306a-306n and initiates a new round of multicasting for the common packets utilizing the previously described process until there are no common missing packets. For all remaining uncommon missing packet(s), reliable multicast logic 312 initiates a unicast session via a reliable data transport protocol with each receiving device of receiving devices 306a-306n to send the uncommon missing packet(s) identified by that receiving device.

Once each of receiving devices 306a-306n receives the entire data block or a subset of the data block that satisfies a data loss target p, receiver logic 324 sends the data block onto application 332. That is, some applications, such as Internet television, video streaming applications, or the like, do not require 100% reliability, thus receiving devices 306a-306n that support such applications may allow a small fraction p of data loss. For those ones of receiving devices 306a-306n that support such applications, when receiver logic 324 receives a subset of the data block that satisfies the data loss target p, those ones of receiving devices 306a-306n stop requesting missing packets and send the data block as is onto application 332. Once receiver logic 324 has sent the data block or subset of the data block onto application 332, feedback logic 328 sends back a block level report containing a list of missing data both at a Media Access Control (MAC) data communication protocol sub-layer and at an application layer to access point 304.

Wireless transmitter/receiver 318 receives the block level report and forwards the block level report to parameter compute logic 330. Rather than using the default forward error correction (FEC) overhead and a default transmission rate as used for the transmission of the initial data block, for a next data block, parameter compute logic 330 determines a new FEC overhead and a new transmission rate for the next data block. Utilizing the received block level report, parameter compute logic 330 calculates the following channel conditions parameters:

A layer 2 packet loss rate ($p_2$) for the previous block (m−1), which identifies a percentage of MAC layer packets missing in the block, A layer 7 packet loss rate ($p_7$) for the previous block (m−1), which identifies a percentage of application layer packets were not able to be decoded in the data block, and A modulation rate (R) used for transmission of the previous block (m−1).

Parameter compute logic 330 calculates an expected transmission time with a goal of minimizing the expected transmission time (ETT) using the following formula:

$$ETT = \left(\frac{W + D_m}{R_m}\right) + \left(\frac{1}{1 - p_2^1(m)} \frac{Wp_7^1(m)}{R_m} + \ldots + \frac{1}{1 - p_2^n(m)} \frac{Wp_7^n(m)}{R_m} + \ldots + \frac{1}{1 - p_2^N(m)} \frac{Wp_7^N(m)}{R_m}\right)$$

where W is the number of packets contained in the block, D is the FEC overhead to be selected, m is the current block, R is the transmission rate to be selected, $p_2$ is a layer 2 packet loss rate, $p_7$ is a layer 7 packet loss rate, n is the receiver index from 1 to N, and N is the number of receivers. In this formula, R and D are variables and $p_2(m)$ and $p_7(m)$ are unknowns. Parameter compute logic 330 equates $p_2(m-1)$ to $p_2(m)$ since $p_2$ captures only a condition of the physical wireless medium. In other words, parameter compute logic 330 makes an assumption that changes in the channel conditions of the physical wireless medium for two consecutive rounds is very small. On the other hand, $p_7(m)$ is an application level loss, which is determined by the selected modulation rate (R). Thus, once parameter compute logic 330 selects R and D and equates $p_2(m)$ to $p_2(m-1)$, the $p_7(m)$ value becomes deterministic. In this embodiment, parameter compute logic 330 pre-computes a relationship between $p_7$ and $(p_2,R,D)$ and uses this pre-computed mapping information to estimate what $p_7(m)$ would be, given historical information as well as the selection of each (R,D) pair. Therefore, utilizing these values, parameter compute logic 330 substitutes different values of D and R in order to achieve a minimum expected transmission time with optimum $D_m$. That is, assuming $p_2(m)=p_2(m-1)$ and using a pre-computed $p_7$ to (R,D, p2) mapping relationship, parameter compute logic 330 chooses pair of (R,D) that will minimize ETT. It should be noted that the first parenthetical represents the broadcast time and the second parenthetical represents the unicast retry times for all clients. The result of this computation results in a new FEC overhead and new transmission rate parameters considering both the broadcast phase and the unicast phase. The illustrative embodiments recognize that above exemplary formula to identify a minimum ETT is only an example, and other objective functions may also be incorporated without departing from the spirit and scope of the invention.

That is, parameter compute logic 330 performs this computation to estimate the impact of parameter selection during the broadcast phase on the performance of the unicast phase. If the selected FEC overhead value in the broadcast phase is too much, then the unicast phase will end quickly, but the broadcast phase transmission may not be efficient (due to heavy FEC protection and lower transmission rate selection). Alternatively, if the selected FEC overhead value in broadcast phase is too little, the broadcast phase will end quickly, but the unicast phase may take a long time to complete (due to repeated unicast retransmissions to fix missing packets). Thus, there is a trade-off and parameter compute logic 330 selects the broadcast phase parameters considering the unicast phase performance so that the overall performance is improved. With the new FEC overhead and new transmission rate parameters selected, FEC encoder 316 encodes the next data block using the selected parameters, which is then forwarded to wireless transmitter/receiver 318. Wireless transmitter/receiver 318 then multicasts the encoded next data block via a reliable data transport protocol to receiving devices 306a-306n.

Within each of receiving devices 306a-306n, wireless transmitter/receiver 320 receives the encoded next data block and forwards the encoded next data block to FEC decoder 322 within receiver logic 324. FEC decoder 322 decodes the encoded next data block and stores the next data block in buffer 326. Based on the status of the data within the received data block, feedback logic 328 within receiver logic 324 responds with missing packets from the next data block. Wireless transmitter/receiver 318 receives an indication of missing data packets from each of receiving devices 306a-306n. Reliable multicast logic 312 determines common missing packets between receiving devices 306a-306n and initiates a new round of multicasting for the common packets utilizing the previously described process until there are no common missing packets. For all remaining uncommon missing packet(s), reliable multicast logic 312 initiates a unicast session via a reliable data transport protocol with each receiving device of receiving devices 306a-306n to send the uncommon missing packet(s).

Once each of receiving devices 306a-306n receives the entire data block or a subset of the data block that satisfies a data loss target p, receiver logic 324 sends the data block onto application 332. That is, some applications, such as Internet television, video streaming applications, or the like, do not require 100% reliability, thus receiving devices 306a-306n that support such applications may allow a small fraction p of data loss. For those ones of receiving devices 306a-306n that support such applications, when receiver logic 324 receives a subset of the data block that satisfies the data loss target p, those ones of receiving devices 306a-306n stop requesting missing packets and send the data block as is onto application 332. Once receiver logic 324 has sent the data block or subset of the data block onto application 332, feedback logic 328 sends back a block level report containing a list of missing data both at a Media Access Control (MAC) data communication protocol sub-layer and at an application layer to access point 304. The process repeats thereafter until all of the data blocks associated with the multicast session have been sent.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
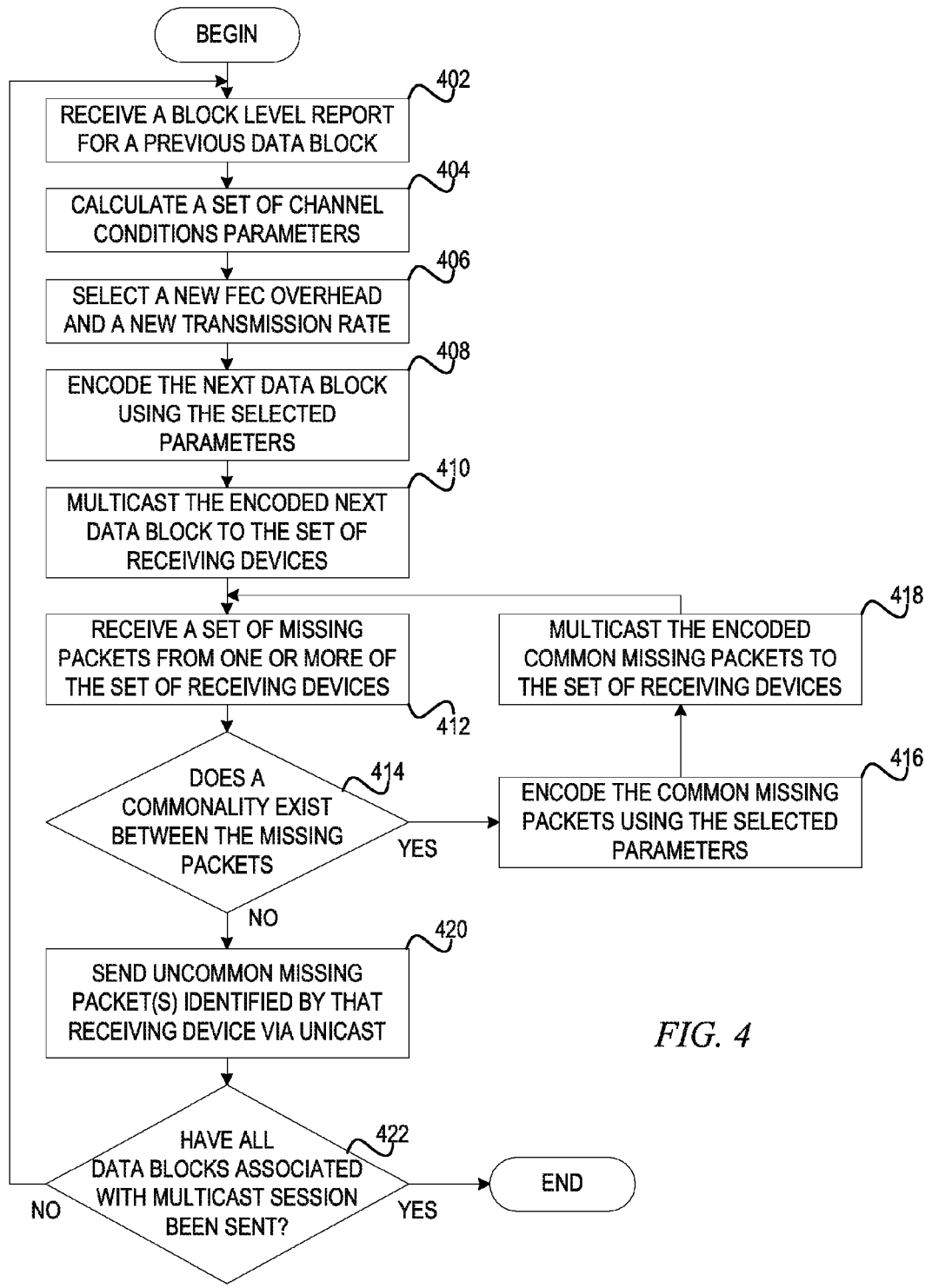
FIG. 4 depicts an exemplary flowchart for the operation performed by reliable multicast logic in an access point that enables an efficient reliable multicast in accordance with an illustrative embodiment.

FIG. 4 depicts an exemplary flowchart for the operation performed by reliable multicast logic in an access point that enables an efficient reliable multicast in accordance with an illustrative embodiment. As the operation begins, reliable multicast logic in an access point receives a block level report for a previous data block containing a list of missing data both at a Media Access Control (MAC) data communication protocol sub-layer and at an application layer from a set of receiving devices (step 402). The reliable multicast logic calculates a set of channel conditions parameters utilizing the received block level report (step 404). The channel conditions parameters are: a layer 2 packet loss rate ($p_2$) for the previous block (m−1), which identifies a percentage of MAC layer packets missing in the block, a layer 7 packet loss rate (p7) for the previous block (m−1), which identifies a percentage of application layer packets were not able to be decoded in the data block, and a modulation rate (R) used for transmission of the previous block (m−1). The reliable multicast logic then selects a new FEC overhead and a new transmission rate utilizing an expected transmission time (ETT) computation (step 406).

With the new FEC overhead and a new transmission rate parameters selected, the reliable multicast logic encodes the next data block using the selected parameters (step 408). The reliable multicast logic then multicasts the encoded next data block via a reliable data transport protocol to the set of receiving devices (step 410). The reliable multicast log then receives a set of missing packets from one or more of the set of receiving devices (step 412). The reliable multicast logic determines whether there is a commonality between the missing packets (step 414). If at step 414 the reliable multicast logic determines that there is a commonality between the missing packets, the reliable multicast logic encodes the common missing packets using the selected parameters (step 416). The reliable multicast logic then multicasts the encoded common missing packets via a reliable data transport protocol to the set of receiving devices (step 418), with the operation returning to step 412.

If at step 414 the reliable multicast logic determines that there is no commonality between the missing packets, the reliable multicast logic initiates a unicast session via a reliable data transport protocol with each receiving device of the set of receiving devices to send the uncommon missing packet(s) identified by that receiving device (step 420). The reliable multicast logic then determines whether all of the data blocks associated with the multicast session have been sent (step 422). If at step 422 the reliable multicast logic determines that not all of the data blocks have been sent, the operation returns to step 402. If at step 422 the reliable multicast logic determines that all of the data blocks have been sent, the operation terminates.

Figure 5:
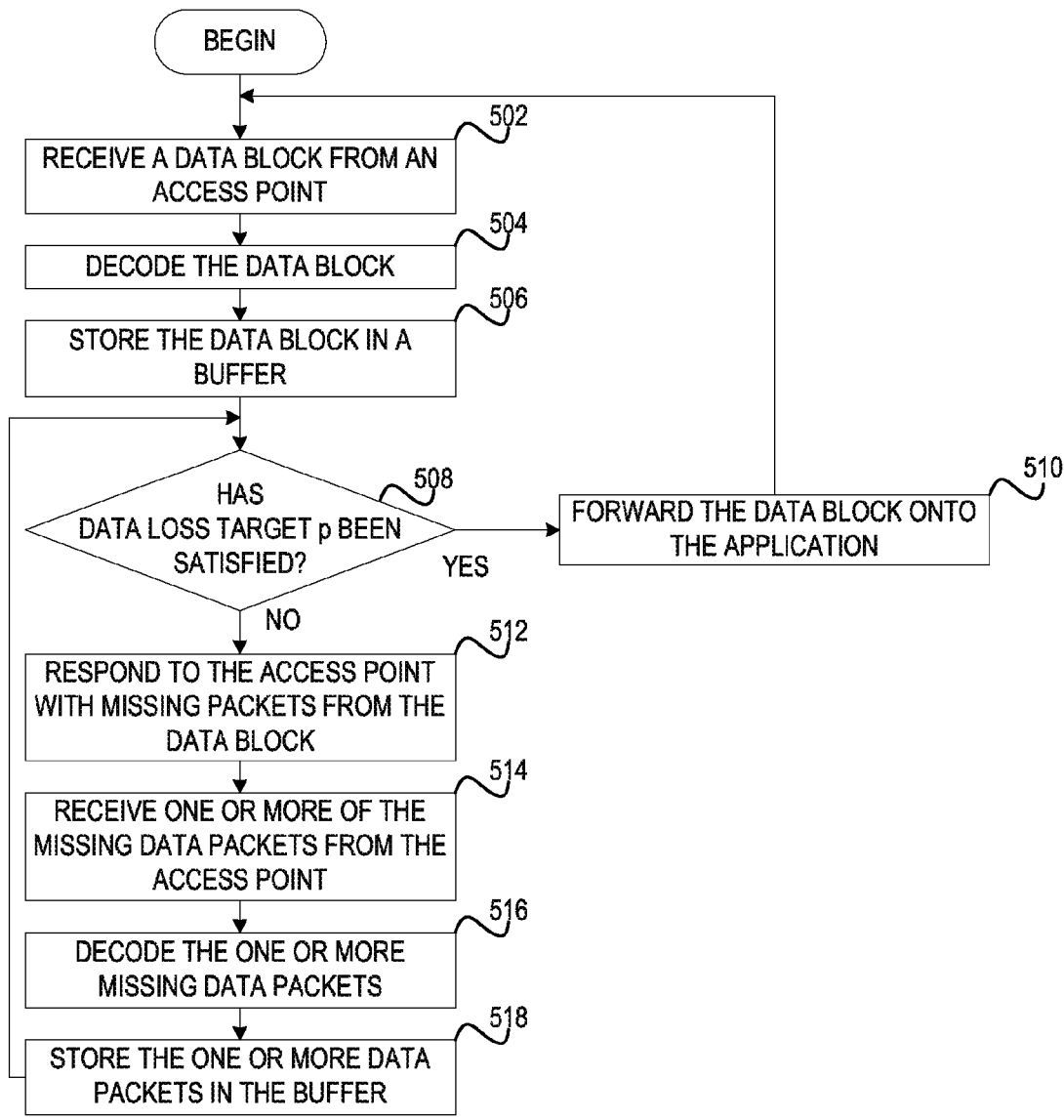
FIG. 5 depicts an exemplary flowchart for the operation performed by each receiving device in a set of receiving devices during an efficient reliable multicast in accordance with an illustrative embodiment.

FIG. 5 depicts an exemplary flowchart for the operation performed by each receiving device in a set of receiving devices during an efficient reliable multicast in accordance with an illustrative embodiment. As the operation begins, the receiving device receives a data block from an access point (step 502). The receiving device decodes the data block (step 504) and stores the data block in a buffer (step 506). Based on the status of the data within the received data block, the receiving device determines whether an amount of the data block that has been received satisfies a data loss target p such that the data block may be forwarded onto an application associated with the data block (step 508).

If at step 508 the amount of the data block satisfies the data loss target p, then the receiving device forwards the data block onto the application (step 510), with the operation returning to step 502. If at step 508 the amount of the data block fails to satisfy the data loss target p, then the receiving device responds to the access point with missing packets from the data block (step 512). The receiving device receives one or more of the missing data packets via a multicast or unicast from the access point (step 514). The receiving device decodes the one or more missing data packets (step 516) and stores the one or more data packets in the buffer (step 518), with the operation returning to step 508.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for generating a reliable multicast session by a sending device that generates a stream of application packets, which are forwarded to an access point. The access point works on a fixed window of these packets and generates a block of coded packets using an FEC mechanism. For a current block of data that needs to be sent, there is a phase of multicasting of coded blocks/packets with rate selection and FEC overhead selection. Then there is a phase of sending missing packets using regular wireless unicast. The second phase is necessary because the first phase cannot guarantee 100% packet reception at the receivers all the time.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for transmitting a multicast session to a plurality of receivers over a wireless network, the method comprising:

determining a forward error correction overhead and a transmission rate for transmission of a next data block of the multicast session based on channel conditions received from the plurality of receivers for a previous data block, wherein the channel conditions comprise a layer 2 packet loss rate for the previous data block, a layer 7 packet loss rate for the previous data block, and a modulation rate used for transmission of the previous data block;

multicasting the next data block using a result of determining the forward error correction overhead and the transmission rate;

responsive to an indication of common missing packets from the next data block from more than one receiver in the plurality of receivers, multicasting the common missing packets to the plurality of receivers using the result of determining the forward error correction overhead and the transmission rate; and responsive to an indication of uncommon missing packets from the next data block from one or more receivers in the plurality of receivers, for each receiver in the one or more receivers, unicasting the uncommon missing packets identified by the receiver using the result of determining the forward error correction overhead and the transmission rate.

2. The method of claim 1, wherein the channel conditions are determined based on a block level report received from the plurality of receivers for the previous data block and wherein the block level report indicates a list of missing data both at a Media Access Control (MAC) data communication protocol sub-layer and at an application layer.

3. The method of claim 1, wherein the result of determining the forward error correction overhead and the transmission rate are determined utilizing an estimated transmission time formula.

4. The method of claim 3, wherein the estimated transmission time formula is:

$$ETT = \left(\frac{W+D_m}{R_m}\right) + \left(\frac{1}{1-p_2^1(m)}\frac{Wp_7^1(m)}{R_m} + \ldots + \frac{1}{1-p_2^n(m)}\frac{Wp_7^n(m)}{R_m} + \ldots + \frac{1}{1-p_2^N(m)}\frac{Wp_7^N(m)}{R_m}\right)$$

where W is the number of packets contained in the next data block, D is a forward error correction overhead to be selected, m is a current data block, R is a transmission rate to be selected, $p_2$ is a layer 2 packet loss rate, $p_7$ is a layer 7 packet loss rate, n is the receiver index from 1 to N, and N is the number of receivers and wherein different values of D and R are substituted into the estimated transmission time formula.

5. The method of claim 1, further comprising:

repeating the determining of the forward error correction overhead and the transmission rate for transmission of the next data block of the multicast session based on the channel conditions received from the plurality of receivers for the previous data block, the multicasting of the next data block using the result of determining the forward error correction overhead and the transmission rate, the multicasting of the common missing packets to the plurality of receivers using the result of determining the forward error correction overhead and the transmission rate in response to the indication of common missing packets from the next data block from more than one receiver in the plurality of receivers, and, for each receiver in the one or more receivers, the unicasting of the uncommon missing packets identified by the receiver using the result of determining the forward error correction overhead and the transmission rate in response to the indication of uncommon missing packets from the next data block from one or more receivers in the plurality of receivers for each of a plurality of data blocks in the multicast session.

6. The method of claim 1, further comprising:
receiving the next data block;
decoding the next data block;
storing one or more packets of the next data block in a buffer;
determining whether an amount of the next data block satisfies a data loss target p such that the next data block may be forwarded onto an application associated with the next data block; and
responsive to the amount of the next data block satisfying the data loss target p, forwarding the next data block onto the application.

7. The method of claim 6, further comprising:
responsive to the amount of the next data block failing to satisfy the data loss target p, identifying missing data packets from the next data block;
receiving one or more of the missing data packets via a multicast or a unicast from an access point;
decoding the one or more missing data packets;
storing the one or more missing data packets in the buffer; and
repeating the determination of whether the amount of the next data block satisfies the data loss target p such that the next data block may be forwarded onto the application associated with the next data block.

8. A computer program product comprising a non-transitory computer readable storage medium having a computer readable program stored therein, wherein the computer readable program, when executed on a computing device, causes the computing device to:
determine a forward error correction overhead and a transmission rate for transmission of a next data block of a multicast session based on channel conditions received from a plurality of receivers for a previous data block, wherein the channel conditions comprise a layer 2 packet loss rate for the previous data block a layer 7 packet loss rate for the previous data block, and a modulation rate used for transmission of the previous data block;
multicast the next data block using a result of determining the forward error correction overhead and the transmission rate;
responsive to an indication of common missing packets from the next data block from more than one receiver in the plurality of receivers, multicast the common missing packets to the plurality of receivers using the result of determining the forward error correction overhead and the transmission rate; and
responsive to an indication of uncommon missing packets from the next data block from one or more receivers in the plurality of receivers, for each receiver in the one or more receivers, unicast the uncommon missing packets identified by the receiver using the result of determining the forward error correction overhead and the transmission rate.

9. The computer program product of claim 8, wherein the channel conditions are determined based on a block level report received from the plurality of receivers for the previous data block and wherein the block level report indicates a list of missing data both at a Media Access Control (MAC) data communication protocol sub-layer and at an application layer.

10. The computer program product of claim 8, wherein the result of determining the forward error correction overhead and the transmission rate are determined utilizing an estimated transmission time formula.

11. The computer program product of claim 10, wherein the estimated transmission time formula is:

$$ETT = \left(\frac{W + D_m}{R_m}\right) + \left(\frac{1}{1 - p_2^1(m)}\frac{Wp_7^1(m)}{R_m} + \ldots + \frac{1}{1 - p_2^n(m)}\frac{Wp_7^n(m)}{R_m} + \ldots + \frac{1}{1 - p_2^N(m)}\frac{Wp_7^N(m)}{R_m}\right)$$

where W is the number of packets contained in the next data block, D is a forward error correction overhead to be selected, m is a current data block, R is a transmission rate to be selected, $p_2$ is a layer 2 packet loss rate, $p_7$ is a layer 7 packet loss rate, n is the receiver index from 1 to N, and N is the number of receivers and wherein different values of D and R are substituted into the estimated transmission time formula.

12. The computer program product of claim 8, wherein the computer readable program further causes the computing device to:
repeat the computer readable program to determine the forward error correction overhead and the transmission rate for transmission of the next data block of the multicast session based on the channel conditions received from the plurality of receivers for the previous data block, to multicast of the next data block using the result of determining the forward error correction overhead and the transmission rate, to multicast of the common missing packets to the plurality of receivers using the result of determining the forward error correction overhead and the transmission rate in response to the indication of common missing packets from the next data block from more than one receiver in the plurality of receivers, and, for each receiver in the one or more receivers, to unicast of the uncommon missing packets identified by the receiver using the result of determining the forward error correction overhead and the transmission rate in response to the indication of uncommon missing packets from the next data block from one or more receivers in the plurality of receivers for each of a plurality of data blocks in the multicast session.

13. An apparatus comprising:
a processor; and
a memory coupled to the processor, wherein the memory comprises instructions which, when executed by the processor, cause the processor to:
determine a forward error correction overhead and a transmission rate for transmission of a next data block of a multicast session based on channel conditions received from a plurality of receivers for a previous data block, wherein the channel conditions comprise a layer 2 packet loss rate for the previous data block, a layer 7 packet loss rate for the previous data block, and a modulation rate used for transmission of the previous data block;
multicast the next data block using a result of determining the forward error correction overhead and the transmission rate;

responsive to an indication of common missing packets from the next data block from more than one receiver in the plurality of receivers, multicast the common missing packets to the plurality of receivers using the result of determining the forward error correction overhead and the transmission rate; and responsive to an indication of uncommon missing packets from the next data block from one or more receivers in the plurality of receivers, for each receiver in the one or more receivers, unicast the uncommon missing packets identified by the receiver using the result of determining the forward error correction overhead and the transmission rate.

14. The apparatus of claim 13, wherein the channel conditions are determined based on a block level report received from the plurality of receivers for the previous data block and wherein the block level report indicates a list of missing data both at a Media Access Control (MAC) data communication protocol sub-layer and at an application layer.

15. The apparatus of claim 13, wherein the result of determining the forward error correction overhead and the transmission rate are determined utilizing an estimated transmission time formula.

16. The apparatus of claim 15, wherein the estimated transmission time formula is:

$$ETT = \left(\frac{W + D_m}{R_m}\right) + \left(\frac{1}{1 - p_2^1(m)} \frac{W p_7^1(m)}{R_m} + \ldots + \frac{1}{1 - p_2^n(m)} \frac{W p_7^n(m)}{R_m} + \ldots + \frac{1}{1 - p_2^N(m)} \frac{W p_7^N(m)}{R_m}\right)$$

where W is the number of packets contained in the next data block, D is a forward error correction overhead to be selected, m is a current data block, R is a transmission rate to be selected, $p_2$ is a layer 2 packet loss rate, $p_7$ is a layer 7 packet loss rate, n is the receiver index from 1 to N, and N is the number of receivers and wherein different values of D and R are substituted into the estimated transmission time formula.

17. The apparatus of claim 13, wherein the instructions further cause the processor to:

repeat the instructions to determine to determine the forward error correction overhead and the transmission rate for transmission of the next data block of the multicast session based on the channel conditions received from the plurality of receivers for the previous data block, to multicast of the next data block using the result of determining the forward error correction overhead and the transmission rate, to multicast of the common missing packets to the plurality of receivers using the result of determining the forward error correction overhead and the transmission rate in response to the indication of common missing packets from the next data block from more than one receiver in the plurality of receivers, and, for each receiver in the one or more receivers, to unicast of the uncommon missing packets identified by the receiver using the result of determining the forward error correction overhead and the transmission rate in response to the indication of uncommon missing packets from the next data block from one or more receivers in the plurality of receivers for each of a plurality of data blocks in the multicast session.

* * * * *